(12) United States Patent
Ju et al.

(10) Patent No.: US 12,169,147 B2
(45) Date of Patent: Dec. 17, 2024

(54) SYSTEM AND METHOD FOR TESTING STRESS STRAIN OF POROUS ROCK UNDER FLUID-SOLID COUPLING EFFECTS

(71) Applicant: CHINA UNIVERSITY OF MINING AND TECHNOLOGY, BEIJING, Beijing (CN)

(72) Inventors: Yang Ju, Beijing (CN); Jiangtao Zheng, Beijing (CN); Zhangyu Ren, Beijing (CN); Wenbo Gong, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 18/039,993

(22) PCT Filed: Nov. 11, 2021

(86) PCT No.: PCT/CN2021/130032
§ 371 (c)(1),
(2) Date: Jun. 2, 2023

(87) PCT Pub. No.: WO2023/082133
PCT Pub. Date: May 19, 2023

(65) Prior Publication Data
US 2023/0349779 A1 Nov. 2, 2023

(51) Int. Cl.
G01L 1/24 (2006.01)
G01N 3/12 (2006.01)
G01N 15/08 (2006.01)

(52) U.S. Cl.
CPC .................. *G01L 1/24* (2013.01); *G01N 3/12* (2013.01); *G01N 15/082* (2013.01);
(Continued)

(58) Field of Classification Search
CPC .......... G01L 1/24; G01N 3/12; G01N 15/082; G01N 2203/0048; G01N 2203/0075; G01N 2203/0647
See application file for complete search history.

(56) References Cited

U.S. PATENT DOCUMENTS 4,782,501 A * 11/1988 Dixon, Jr. ............ G01N 15/088
378/4
5,036,193 A * 7/1991 Davis, Jr. ............. G01N 15/088
378/4

(Continued)

FOREIGN PATENT DOCUMENTS

CN 109094030 A 12/2018
CN 110542614 A 12/2019

(Continued)

*Primary Examiner* — Roy M Punnoose
(74) *Attorney, Agent, or Firm* — Yue (Robert) Xu; Apex Attorneys at Law, LLP

(57) ABSTRACT

Disclosed are a testing system and method under fluid-solid coupling effects. A dynamic stress field during fluid flow, deformation of a porous rock framework, real-time evolution of the stress field and deformation of a fluid-solid interface under fluid-solid coupling effects can be obtained, on the basis of a collected photo-elastic stripe image and a surface deformation image. A stress field of a solid framework and fluid in porous rock, and a strain field of the solid framework and the fluid-solid interface under fluid-solid coupling effects can be visually and quantitatively displayed by means of a display device.

7 Claims, 8 Drawing Sheets

(52) U.S. Cl.
CPC ............... *G01N 2203/0048* (2013.01); *G01N 2203/0075* (2013.01); *G01N 2203/0647* (2013.01)

(56) References Cited

U.S. PATENT DOCUMENTS

| | | | |
|---|---|---|---|
| 5,146,086 A * | 9/1992 | De | G01N 33/24 |
| | | | 250/256 |
| 6,041,018 A * | 3/2000 | Roche | G01V 1/366 |
| | | | 367/48 |
| 9,835,762 B2 * | 12/2017 | Pairoys | G01N 33/24 |
| 10,082,454 B2 * | 9/2018 | Lawandy | G07D 7/1205 |
| 2017/0102277 A1 * | 4/2017 | Bandi | G01L 1/241 |
| 2019/0360904 A1 * | 11/2019 | Ju | E21B 43/164 |

FOREIGN PATENT DOCUMENTS

| | | | | |
|---|---|---|---|---|
| CN | 111428426 A | | 7/2020 | |
| CN | 112903470 A | | 6/2021 | |
| CN | 213903095 U | * | 8/2021 | ............... G01N 3/04 |
| WO | WO-2018155115 A1 | * | 8/2018 | ............. G01B 11/16 |

\* cited by examiner

SYSTEM AND METHOD FOR TESTING STRESS STRAIN OF POROUS ROCK UNDER FLUID-SOLID COUPLING EFFECTS

FIELD

The present application relates to the technical field of strain field and stress field measurement under hydromechanical coupling effect, and in particular to a test system and method for porous rock.

BACKGROUND

Most underground engineering fields involve complex hydromechanical coupling processes. The inflow or outflow of fluid may lead to the change of the stress state of the porous rock skeleton, which may lead to the deformation of the porous structure in the rock, and this deformation in turn affects the flow of the fluid. In addition, the hydromechanical coupling process is a real-time and dynamic process. For example, in the field of oil exploration, hydraulic fracturing technology has been widely used in stimulating unconventional reservoirs. The injection of high-pressure fluid leads to the change of the reservoir stress field, and the change of the reservoir stress field in turn affects the fluid flow in the reservoir. The dynamic hydromechanical coupling behavior directly controls the propagation of fracture and the flow behavior of fracturing fluid. A series of enhanced oil recovery methods used in the process of oil and gas resource exploitation are also a dynamic hydromechanical coupling process. For example, the secondary water injection development may lead to changes in the stress field of the reservoir, resulting in changes in the porous structure of the reservoir, which in turn may affect the water-oil flow path and displacement behavior, and ultimately lead to different recovery ratios. Therefore, hydromechanical coupling effect is an important factor for a series of underground engineering applications. One of the key problems is accurately measure the stress-strain evolution inside the rock under the hydromechanical coupling effect, including: dynamic stress field during fluid flow; real-time evolution of stress field, deformation of porous rock skeleton and deformation of fluid-solid interface.

The traditional stress test methods are mostly based on the assumption of continuous and homogeneous medium, and the internal stress of the rock was assumed uniformly distributed. It is difficult to achieve real-time measurement of the stress-strain field of the fluid and solid skeleton in the complex porous structure under the hydromechanical coupling effect. Therefore, how to realize the visualization of the stress field-strain field under the hydromechanical coupling effect in the rock porous structure, and obtain the dynamic stress field during fluid flow, deformation of porous rock skeleton and real-time evolution of stress field, and deformation of fluid-solid interface, is still an urgent problem to be solved.

SUMMARY

In view of this, a test system and method for stress and strain of porous rock under hydromechanical coupling effect is provided according to the present application, which may obtain the dynamic stress field during the fluid flow; the real-time evolution of porous rock skeleton deformation and stress field and the deformation of fluid-solid interface under the hydromechanical coupling effect based on the collected photoelastic fringe images and surface deformation images, and may transparently, intuitively and quantitatively display the stress field of solid skeleton and fluid in porous rock and the strain field at the interface between solid skeleton and pores.

In order to achieve the above object, the following technical solutions are provided according to the present application.

A test system for stress and strain of porous rock under the hydromechanical coupling effect, includes:
  a porous medium model, which is made of a photoelastic material with stress birefringence;
  a porous medium model loading device, and the porous medium model is placed in the porous medium model loading device, and the porous medium model loading device is used for imposing boundary constraints on the porous medium model, and performing high-pressure injection of stress birefringence fluid in the pores, so as to form the dynamic hydromechanical coupling effect of fluid flow process;
  a measuring device used for obtaining a photoelastic fringe image and a surface deformation image of the porous medium model under the hydromechanical coupling effect;
  the photoelastic fringe image is used to determine the stress field of the fluid and the porous skeleton under the hydromechanical coupling effect; the surface deformation image is used to determine the strain field of the porous skeleton and/or the fluid-solid interface under the hydromechanical coupling effect.

Preferably, in the above system, the measuring device includes:
  a photoelasticity experimental device for obtaining the photoelastic fringe image;
  a digital image correlation measuring device for obtaining the surface deformation image.

Preferably, in the above system, the photoelasticity experimental device includes the following components arranged in sequence on a same optical axis: a light source, a polarizer, a first quarter-wave plate, a second quarter-wave plate, an analyzer, and a first image acquisition device:
  the porous medium model and the porous medium model loading device are placed between the first quarter-wave plate and the second quarter-wave plate.

Preferably, in the above system, a surface of the porous medium model is provided with speckles for deformation measurement;
  the digital image correlation method measuring device includes a second image acquisition device configured to obtain a displacement image of the speckles, and the displacement image is used as the surface deformation image.

Preferably, the above system further includes a host computer having an image solver, and the image solver is used for obtaining the stress field of the fluid and the porous skeleton under the hydromechanical coupling effect based on the photoelastic fringe image, and obtaining the strain field of the porous skeleton and/or the fluid-solid interface under the hydromechanical coupling effect based on the surface deformation image.

Preferably, the above system further includes a 3D printing device, which is used for printing the porous medium model using a material with stress birefringence.

Preferably, in the above system, the stress birefringence fluid is a high molecular polymer solution or a colloidal solution with birefringence effect.

A test method of stress and strain of porous rock under hydromechanical coupling effect is further provided according to the technical solution of the present application includes:

preparing a porous medium model, which is made of a material with stress birefringence;

placing the porous medium model in a porous medium model loading device, and imposing boundary constraints on the porous medium model by the porous medium model loading device, and performing high-pressure injection of stress birefringence fluid in the pores, so as to form the dynamic hydromechanical coupling effect of fluid flow process;

obtaining the photoelastic fringe image and the surface deformation image of the porous medium model under the hydromechanical coupling effect by the measuring device;

and the photoelastic fringe image is used to determine the stress field of the fluid and the porous skeleton under the hydromechanical coupling effect; the surface deformation image is used to determine the strain field of the porous skeleton and/or the fluid-solid interface under the hydromechanical coupling effect.

Preferably, the above method further includes: obtaining, through the image solver, the stress field of the fluid and the porous skeleton under the hydromechanical coupling effect based on the photoelastic fringe image, and obtaining the strain field of the porous skeleton and/or the fluid-solid interface under the hydromechanical coupling effect based on the surface deformation image.

Preferably, the method for preparing the porous medium model includes:

obtaining in-situ geological information at an engineering site;

obtaining a digital model through CT scan or computer reconstruction algorithm based on the in-situ geological information;

performing, 3D printing with a material having stress birefringence to form the porous medium model based on the digital model information.

It can be seen from the above description that in the test system and method, the dynamic stress field during fluid flow; the real-time evolution of porous rock skeleton deformation and stress field and the deformation of fluid-solid interface under the hydromechanical coupling effect may be obtained based on the collected photoelastic fringe images and surface deformation images. The stress field of solid skeleton and fluid in porous rock and the strain field at the interface between solid skeleton and the fluid under the hydromechanical coupling effect may be transparently, intuitively and quantitatively visualized.

BRIEF DESCRIPTION OF THE DRAWINGS

To describe the technical solutions in the embodiments of the present application or in the related technology more clearly, the accompanying drawings describing the embodiments are briefly introduced hereinafter. Apparently, the accompanying drawings in the following description show merely the embodiments of the present application, and a person of ordinary skill can derive other drawings from these accompanying drawings without creative efforts.

The structure, scale, size and the like shown in the figure of this specification are only used to match the contents disclosed in this specification for those skilled in the art to understand and read, and are not used to limit the implementation conditions of this application, so it has no technical substantive significance. Any structural modification, proportional relationship change or size adjustment should still fall within the scope of the technical content disclosed in the present application without affecting the effects and objectives that the present application can produce.

DETAILED DESCRIPTION OF THE EMBODIMENTS

Technical solutions in the embodiments of the present disclosure are clearly and completely described below in accompany with the drawings of the embodiments of the present disclosure. Apparently, the embodiments described in the following are only some embodiments of the present disclosure, rather than all of the embodiments. Any other embodiments obtained by those skilled in the art based on the embodiments in the present disclosure without any creative effort shall fall within the protection scope of the present disclosure.

In order to make the above objects, features, and advantages of the present disclosure more obvious and understandable, the present disclosure will be further described in detail below in conjunction with the accompanying drawings and specific embodiments.

Figure 1:
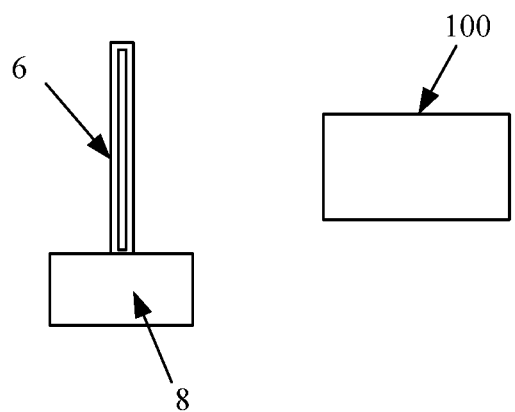
FIG. 1 is a structural schematic diagram of a test system under hydromechanical coupling effect provided by the embodiment of the present application.

FIG. 1 is a structural schematic diagram of a test system under hydromechanical coupling effect provided by the embodiment of the present application, including:

a porous medium model 6, which is made of a material with stress birefringence effect;

a porous medium model loading device 8, the porous medium model 6 is placed in the porous medium model loading device 8, and the porous medium model loading device 8 is used for imposing boundary constraints on the porous medium model 6, and performing high-pressure injection of stress birefringence fluid in the pores, so as to form the dynamic hydromechanical coupling effect of fluid flow process;

a measuring device 100 used for obtaining a photoelastic fringe image and a surface deformation image of the porous medium model under the hydromechanical coupling effect;

and the photoelastic fringe image is used to determine the stress field of the fluid and the porous skeleton under the hydromechanical coupling effect; the surface deformation image is used to determine the strain field of the porous skeleton and/or the fluid-solid interface under the hydromechanical coupling effect.

The dynamic stress field during fluid flow; the real-time evolution of porous rock skeleton deformation and stress field and the deformation of fluid-solid interface under the hydromechanical coupling effect may be obtained based on the collected photoelastic fringe images and surface deformation images. The stress field of solid skeleton and fluid in porous rock and the strain field at the interface between solid skeleton and the fluid under the hydromechanical coupling effect may be transparently, intuitively and quantitatively visualized.

In the embodiment of the present application, the porous medium model 6 is made by a material with stress birefringence, which can be formed by 3D printing technology. Based on this, the system further includes: a 3D printing device, which is used for printing and forming the porous medium model 6 using a material with stress birefringence.

Figure 2:
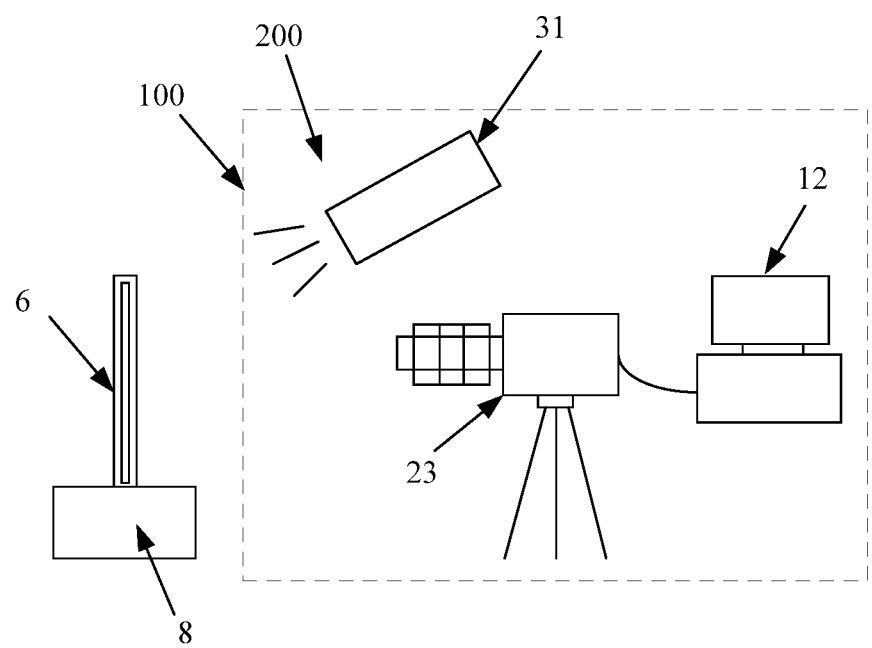
FIG. 2 is a structural schematic diagram of another test system under hydromechanical coupling effect provided by the embodiment of the present application.

FIG. 2 is a structural schematic diagram of another test system under hydromechanical coupling effect provided by the embodiment of the present application. Based on the system shown in FIG. 1, in the system shown in FIG. 2, the measuring device 13 includes: a photoelasticity experimental device 200 for obtaining the photoelastic fringe image; a digital image correlation measuring device for obtaining the surface deformation image. The digital image correlation measuring device is not shown in FIG. 2.

The photoelasticity experimental device 200 includes a light source 31 and a first image acquisition device 23 to obtain a photoelastic fringe image; the digital image correlation measuring device includes a second image acquisition device to obtain the surface deformation image. In the embodiment of the present application, the first image acquisition device 23 and the second image acquisition device is a CCD camera or an industrial camera. The first image acquisition device 23 and the second image acquisition device may be two independent image acquisition devices, or the same image acquisition device to obtain the photoelastic fringe image and the surface deformation image in a time-sharing manner.

The porous medium model 6 is placed in the optical path of the photoelasticity experimental device 200 and the digital image correlation measuring device to obtain the photoelastic fringe image and the surface deformation image, and based on which to calculate the stress field and the strain field through the corresponding image solving algorithm.

As shown in FIG. 2, in the embodiment of the present application, the system further includes: a host computer 12 having an image solver, and the image solver is used for obtaining the stress field of the fluid and the porous skeleton under the hydromechanical coupling effect based on the photoelastic fringe image, and obtaining the strain field of the porous skeleton and/or the fluid-solid interface under the hydromechanical coupling effect based on the surface deformation image. In an embodiment, the host computer 12 further includes a display device for displaying the stress field and the strain field, which can be displayed through images or data that are intuitively visible to the human eye. The image solver may obtain the full-field stress experiment result of the porous medium model 6 based on the processing of the photoelastic fringe image, the image solver may also obtain the strain field of the porous medium model 6 based on processing the surface deformation image.

Figure 3:
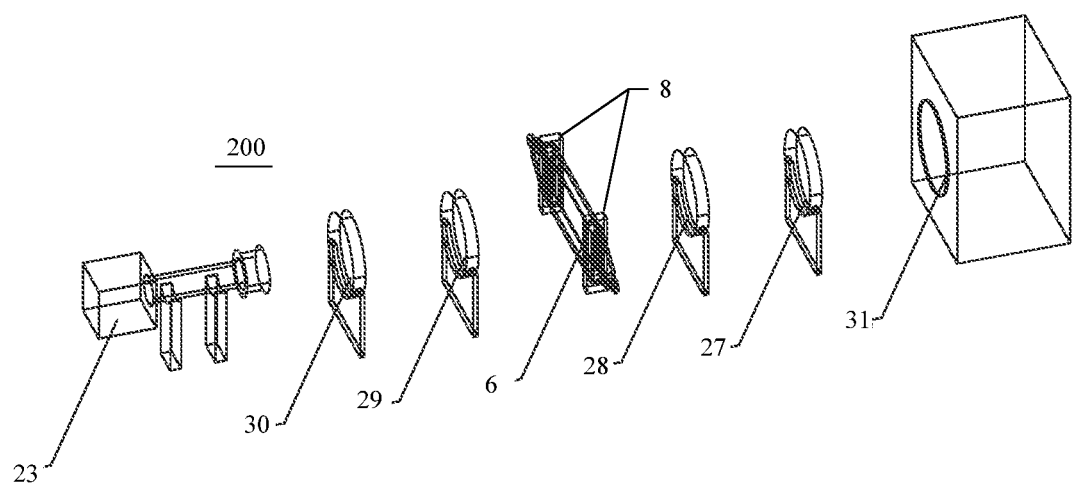
FIG. 3 is a schematic structural diagram of a photoelasticity experimental device provided by an embodiment of the present application.

FIG. 3 is a schematic structural diagram of a photoelasticity experimental device provided by an embodiment of the present application. The photoelasticity experimental device 200 includes the following components arranged in sequence on a same optical axis: a light source 31, a polarizer 27, a first quarter-wave plate 28, a second quarter-wave plate 29, an analyzer 30, and a first image acquisition device 23: the porous medium model 6 and the porous medium model loading device 8 are placed between the first quarter-wave plate 28 and the second quarter-wave plate 29. The light source 31 may be a white light lamp. The polarizer 27 may convert the incident white light into polarized light. The first quarter-wave plate 28 may convert the plane polarized light derived from the polarizer 27 into circularly polarized light. The analyzer 30 is used to check the deflection of the polarized light after being processed by the hydromechanical coupling effect sample.

Figure 4:
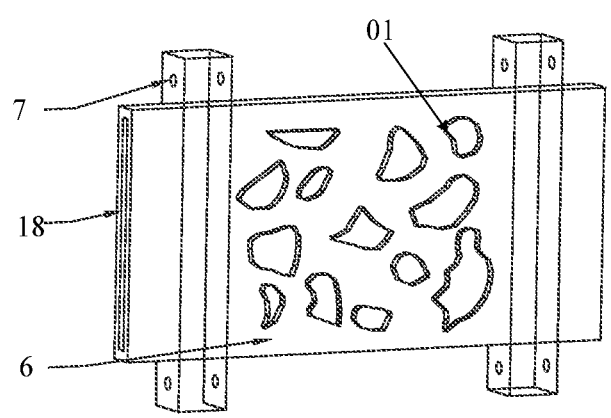
FIG. 4 is a structural schematic diagram of a porous medium model provided by the embodiment of this application when mounted in a porous medium model loading device.

FIG. 4 is a structural schematic diagram of a porous medium model provided by the embodiment of this application when mounted in a porous medium model loading device. A surface of the porous medium model 6 is provided with speckle 01 for deformation measurement, the speckle 01 is a marking point for DIC measurement formed by printing near the porous side wall of the porous medium model 6. The digital image correlation measuring device is used to measure the related measurement data of the porous medium model 6, and may accurately measure the related measurement data of the strain field near the fluid-solid interface. The digital image correlation method measuring device includes: a second image acquisition device configured to obtain a displacement image 01 of the speckle, and the displacement image is used as the surface deformation image. The displacement image may be obtained based on the comparison of the speckle image collected by the second image acquisition device before the occurrence of the dynamic hydromechanical coupling effect and the speckle image collected by the second image acquisition device after the occurrence of the dynamic hydromechanical coupling effect. The porous medium model 6 has an injection port 18 for injecting a stress birefringent fluid. The porous medium model loading device 8 includes a porous medium model helical restraint device 7.

Figure 5:
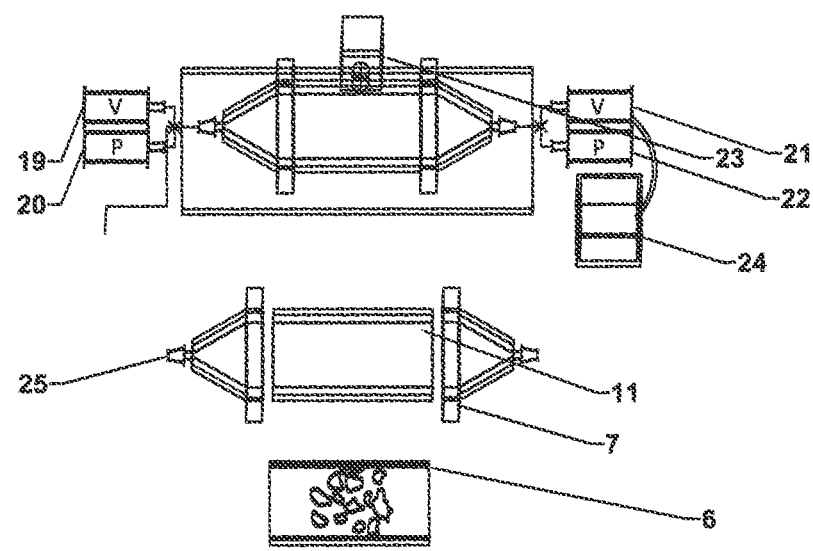
FIG. 5 is a schematic structural diagram of a porous medium model and a high-pressure displacement loading device provided in an embodiment of the present application.

In the embodiment of the present application, the porous medium model loading device 8 is a high-pressure displacement loading device, and its structure may be as shown in FIG. 5. The porous medium model 6 forms hydromechanical coupling effect in the model under the combined action of boundary loading and fluid high-pressure displacement.

FIG. 5 is a schematic structural diagram of a porous medium model and a high-pressure displacement loading device provided in an embodiment of the present application. In conjunction with FIG. 4 and FIG. 5, the high-pressure displacement loading device includes: a porous medium model screw restraint device 7, an injection end flow rate injection pump 19, an injection end pressure control pump 20, an outlet end flow rate control pump 21, an outlet end pressure control pump 22 and a waste liquid collection pool 24. The high-pressure displacement loading device further includes a two-phase interface stabilization device 25 at the injection end. The porous medium model 6 is placed in the high-pressure displacement loading device, and the porous medium model 6 may form hydromechanical coupling effect 11.

In the embodiment of the present application, the stress birefringence fluid is a high molecular polymer solution or a colloidal solution with birefringence effect. The porous medium model 6 and the stress birefringence fluid form a dynamic fluid-structure coupling effect of the fluid flow process under the combined action of boundary constraints and high-pressure fluid injection. The high molecular polymer solution or the colloidal solution is a fluid composed of macromolecules and satisfying the light-force law of the photoelastic material in the photoelastic method. A fluid tracer is mixed in the stress birefringence fluid. The fluid tracer is a marker added for measuring the velocity field distribution of the stress birefringence fluid during displacement.

The system described in the embodiments of the present application further includes a displacement sensor and a force sensor, which are used to measure relative measurement data of displacement and stress before and after the hydromechanical coupling effect.

As can be seen from the above description, through the display of the corresponding stress field and strain field by the display device, the system described in the embodiment of this application can be used as a transparent visual test system for hydromechanical coupling effect in the process of fluid flow in rock pore structure.

The porous medium model 6 may be a rock pore structure model, located in the optical path of the photoelasticity experimental device 200 and the DIC measuring device. After the stress birefringence fluid is injected into the porous medium model 6 at high pressure, it may cause the fluid flow inside the rock pore structure model and the deformation of the solid skeleton, forming a complex hydromechanical coupling dynamic process. The photoelasticity experimental device 200 may obtain the photoelastic dimming image of the porous medium model under the hydromechanical coupling effect, so as to obtain the stress field of the fluid and the pore skeleton. The DIC measuring device may obtain the displacement image of the speckles of the porous medium model under the hydromechanical coupling effect, which is used to obtain the strain field of the pore skeleton, especially the strain field of the fluid-solid interface.

It can be seen that a test system for dynamic stress field, pore rock skeleton deformation and stress field change and deformation of fluid-solid interface during fluid flow under hydromechanical coupling effect is provided according to the technical solution described in the embodiment of the present application, which may effectively obtain the fluid flow process in porous rock under hydromechanical coupling effect, and may also transparently, intuitively and quantitatively display the full-field information and evolution process of stress-strain field in porous rock under hydromechanical coupling effect.

Figure 6:
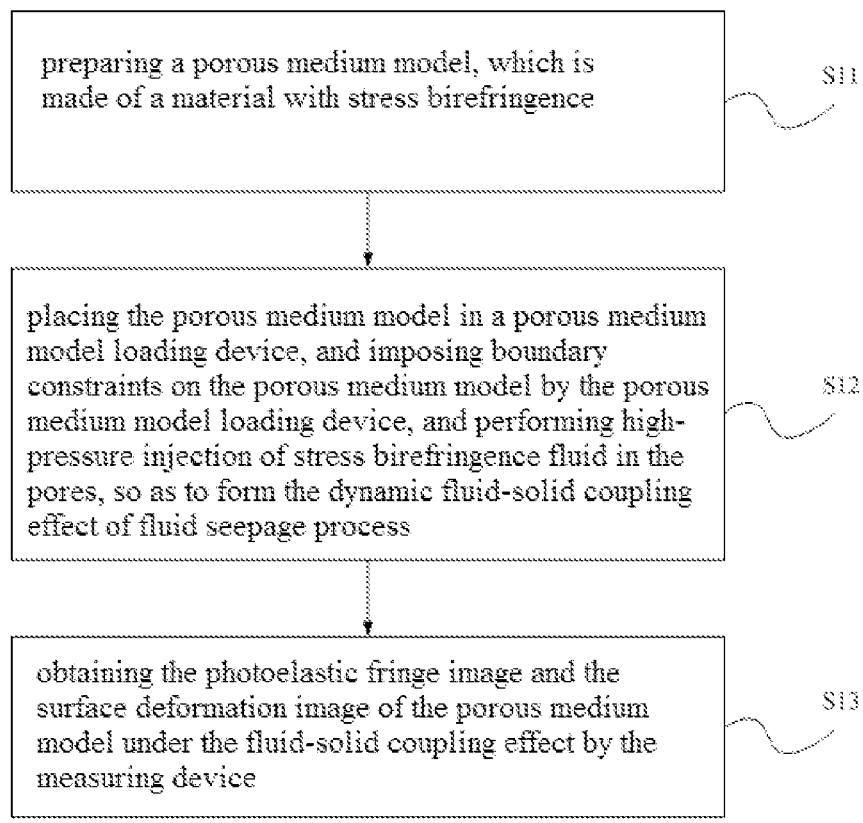
FIG. 6 is a schematic flowchart of a test method under fluid-structure coupling effect provided by an embodiment of the present application.

Based on the above system, a test method under the hydromechanical coupling effect is further provided according to another embodiment of the present application, the method is shown in FIG. 6, FIG. 6 is a schematic flowchart of a stress field test method under hydromechanical coupling effect provided by an embodiment of the present application, and the method includes:

step S11: preparing a porous medium model, which is a material with stress birefringence;

step S12: placing the porous medium model in a porous medium model loading device, and imposing boundary constraints on the porous medium model by the porous medium model loading device, and performing high-pressure injection of stress birefringence fluid in the pores, so as to form the dynamic hydromechanical coupling effect-fluid structure interaction of fluid flow process;

step S13: obtaining the photoelastic fringe image and the surface deformation image of the porous medium model under the hydromechanical coupling effect-fluid-structure interaction by the measuring device;

and the photoelastic fringe image is used to determine the stress field of the fluid and the porous skeleton under the hydromechanical coupling effect; the surface deformation image is used to determine the strain field of the porous skeleton and/or the fluid-solid interface under the hydromechanical coupling effect.

Figure 7:
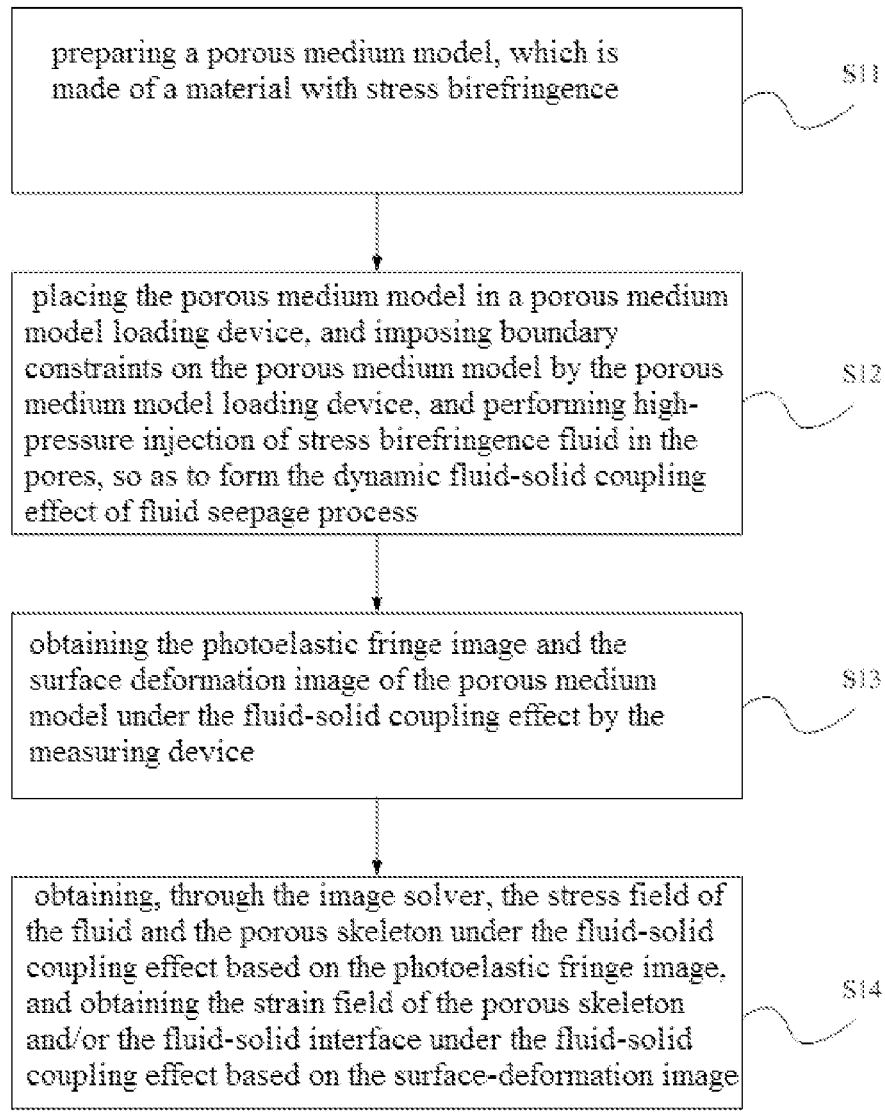
FIG. 7 is a schematic flowchart of another test method under fluid-structure coupling effect provided by an embodiment of the present application.

As shown in FIG. 7, FIG. 7 is a schematic flowchart of another test method under fluid-structure coupling effect provided by an embodiment of the present application, based on the method shown in FIG. 6, the method shown in FIG. 7 further includes:

step S14: obtaining, through the image solver, the stress field of the fluid and the porous skeleton under the hydromechanical coupling effect based on the photoelastic fringe image, and obtaining the strain field of the porous skeleton and/or the fluid-solid interface under the hydromechanical coupling effect based on the surface deformation image.

Figure 8:
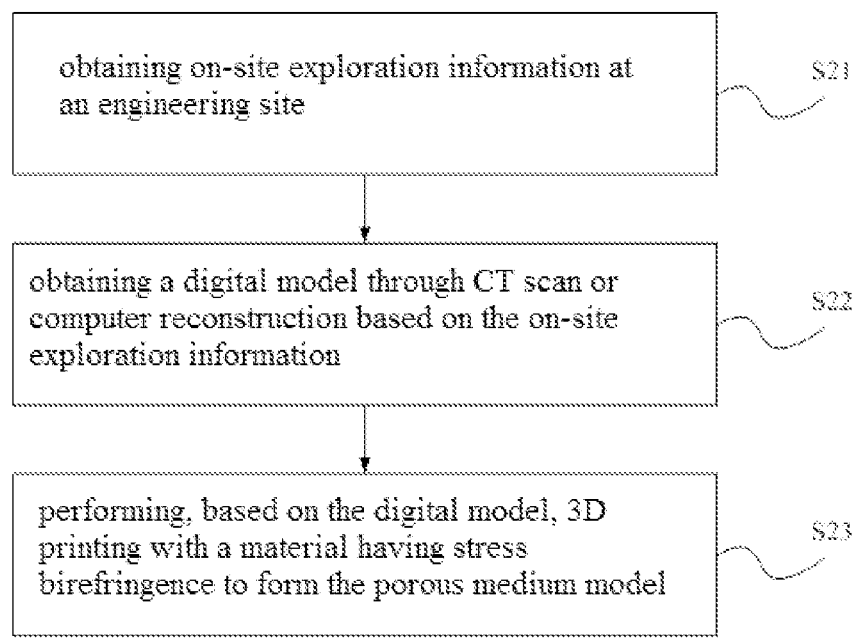
FIG. 8 is a schematic flowchart of a method for preparing the porous medium model provided by the embodiment of the present application.

As shown in FIG. 8, FIG. 8 is a schematic flowchart of a method for preparing the porous medium model provided by the embodiment of the present application, the method includes:

step S21: obtaining on-site exploration information at an engineering site;

step S22: obtaining a digital model through CT scan or computer reconstruction based on the on-site exploration information;

step S23: performing, based on the digital model, 3D printing with a material having stress birefringence to form the porous medium model.

Aiming at the problem of stress and strain measurement of porous media, the test method described in the embodiment of this application can be realized by the test system described in the above embodiment, and the implementation method is as follows:

firstly, the stratum model or the customary scale porous medium model is established through the on-site exploration information collected at the engineering site and the CT scanning images, and the 3D printing digital model is constructed by using digital modeling technology.

then, the stress birefringent material is used to make a 3D model with 3D printing to create a visual physical model. The 3D model is then post-processed and model built to obtain a porous medium model that can be used for fluid-structure interaction experiments.

The porous medium model is placed in the high-pressure displacement loading device, and the high-pressure displacement loading device imposes boundary loads or boundary constraints on the porous medium model, and the fluid in the pores adopts birefringence effect fluid. Then, the porous medium model is placed in the optical path of the photoelasticity experimental device, and the photoelastic fringe image of the porous medium model is obtained by optical phase shift technology. The stress field of the porous medium model may be obtained by an image solver based on the photoelastic fringe image. The surface deformation image may also be measured by the DIC measurement device, and the strain field distribution during the measurement process may be obtained based on the surface deformation image through the image solver.

In the above measurement process, the porous medium model is placed in a high-pressure displacement loading device, and photoelasticity experimental devices are arranged on both sides of the porous medium model. All components in the photoelasticity experimental device are located on the same optical axis.

Through the above description, the specific operation steps for measuring the stress field and strain field of the porous medium model include:

firstly, the exploration information, such as reservoir profile, CT scanning pictures of rock strata, etc., are sorted and analyzed by mobile phone at the project site;

secondly, based on the collected and analyzed data, a digital model conforming to the exploration information is constructed by using porous medium modeling technology, such as CT scanning image reconstruction or 3D CAD design software, and the digital model is transferred to a file format that can be recognized by 3D printing manufacturing technology of porous medium model;

thirdly, materials with stress birefringence are selected to make 3D printing models of porous medium, such as VeroClearTMRGD810 material/Tangopluste™ FLX 930 material or their mixtures in different proportions. The rock mass structure surface is printed with SUP706 support material, and the 3D printing model of the rock mass is made by a STRATASYS J750 printer, and the features near the pore structure wall are marked with light spots during the construction process;

fourthly, the support material on the surface of the 3D printing model of the porous medium model is removed, and then the model is put into an incubator at 30° C. for 48 hours of airtight constant temperature curing. After being taken out of the incubator, grinding and polishing are performed to obtain a porous medium model that can be used for hydromechanical coupling simulation experiments;

fifthly, appropriate recorded values are obtained through field exploration information, and use the loading device to impose boundary constraints and birefringent fluid displacement pressures on the porous medium model;

sixthly, the loading device is placed in the photoelasticity experimental device, ensuring that the centers of the porous medium model, the light source, the polarizer, the first quarter-wave plate, the second quarter-wave plate, the analyzer and the first image acquisition device are on the same horizontal line, and turning on the light source;

seventhly, the photoelastic technology is used to control the angles of the polarizer, the wave plate and the analyzer, and the photoelastic fringe image at the corresponding angle is captured by the first image acquisition device. The photoelastic fringe image is processed by the image solver to obtain the experimental results of the stress field of the porous medium model, including relevant data such as shear stress and principal stress difference;

eighthly, DIC measuring device is used to measure the strain field of pore skeleton and fluid-solid interface. The DIC measurement optical path ensures that the second image acquisition device may observe the porous medium model in the hydromechanical coupling process from different angles, and has no influence on the measurement light path of photoelasticity experimental device. The displacement field of the porous medium model is obtained by the second image acquisition device in the DIC measuring device. The displacement field includes the surface deformation image, and an experimental result of the strain field of the porous medium model is obtained based on the displacement image by an image solver.

ninthly; the fluid displacement pressure is changed by the high-pressure displacement loading device, the sealing and displacement process is simulated, and the seventh and eighth steps are repeated to obtain the experimental results of stress field and strain field of porous medium model.

Based on the methods described in the embodiments of the present application, images of different states of the porous medium model can be obtained, and results corresponding to the stress field and the strain field can be obtained.

It should be noted that, in the embodiment of the present application, when making the porous medium model, it is not limited to the use of the above printing materials and printers, and other processes or types of printers and printing materials can also be used: when making a porous medium model, the porous medium model is not limited to one post-processing method: the photoelasticity experimental device is not limited to the optical path layout given in the embodiments of this application: when obtaining photoelastic fringe images and displacement field, it is not limited to CCD cameras or industrial cameras, but also other image acquisition devices such as single-lens reflex cameras and digital cameras.

The above embodiments are described in a progressive, or juxtaposed, or a combination of progressive and juxtaposed manner. Each of the embodiments is mainly focused on describing its differences from other embodiments, and reference may be made among these embodiments with respect to the same or similar parts. For the laser resonator disclosed in the embodiment, since it corresponds to the electro-optical modulation device disclosed in the embodiment, the description is relatively simple, and the relevant part can be referred to the description of the electro-optical modulation device.

It should be noted that, in the description of the present application, it should be understood that an orientation or a position relation indicated by terms "up", "down", "top", "bottom", "inside", "outside" or the like is described based on an orientation or a position relation shown in the drawings, and is only used for describing the present application and simplifying the description, rather than instructing or implying that a device or element related to the terms has a specific orientation or is constructed and operated in a specific orientation. Therefore, the terms should be not construed as limitations to the present application. If a component is considered to be "connected" to another component, the component can be directly connected to another component or there may be a component arranged between the two components.

It should be further illustrated that a relation term such as "first" and "second" herein is only used to distinguish one entity or operation from another entity or operation, and does not necessarily require or imply that there is an actual relation or sequence between these entities or operations. Furthermore, terms such as "include", "comprise" or any other variations thereof are intended to be non-exclusive. Therefore, an article or device including a series of elements includes not only the elements but also other elements that are not enumerated, or further includes the elements inherent for the article or device. Unless expressively limited, the statement "including a . . . " does not exclude the case that other similar elements may exist in the article or the device other than enumerated elements.

According to the embodiments disclosed above, a person skilled in the art can implement or use the present application. Various modifications to the embodiments are obvious to the person skilled in the art, and general principles defined in the present application may be implemented in other embodiments without departing from the spirit or scope of the present application. Therefore, the present application shall not be limited to the embodiments described herein but have the widest scope that complies with the principle and novelty disclosed in this specification.

The invention claimed is:

1. A test system under a hydromechanical coupling effect, comprising:
 a porous medium model, which is made of a material with stress birefringence;
 a porous medium model loading device, wherein the porous medium model is placed in the porous medium model loading device, the porous medium model loading device imposes boundary constraints on the porous medium model, and performs high-pressure injection of stress birefringence fluid in pores, so as to form the hydromechanical coupling effect of fluid flow process;
 a measuring device that obtains:
 a photoelastic fringe image and determines a stress field of a fluid and a porous skeleton under the hydromechanical coupling effect; and
 a surface deformation image of the porous medium model under the hydromechanical coupling effect and determines a strain field of the porous skeleton and/or a fluid-solid interface under the hydromechanical coupling effect.

2. The system according to claim 1, wherein the measuring device comprises:
 a photoelasticity experimental device for obtaining the photoelastic fringe image;
 a digital image correlation measuring device for obtaining the surface deformation image.

3. The system according to claim 2, wherein the photoelasticity experimental device comprises following components arranged in sequence on a same optical axis: a light source, a polarizer, a first quarter-wave plate, a second quarter-wave plate, an analyzer, and a first image acquisition device; wherein the porous medium model and the porous medium model loading device are placed between the first quarter-wave plate and the second quarter-wave plate.

4. The system according to claim 2, wherein a surface of the porous medium model is provided with speckles for deformation measurement;
 wherein the digital image correlation method measuring device comprises: a second image acquisition device configured to obtain a displacement image of the speckles, and the displacement image is used as the surface deformation image.

5. The system according to claim 1, further comprising: a 3D printing device, which prints and forms the porous medium model using a material with stress birefringence.

6. The system according to claim 1, wherein the stress birefringence fluid is a high molecular polymer solution or a colloidal solution with birefringence effect.

7. A test method under a hydromechanical coupling effect, comprising:
 preparing a porous medium model, which is made of a material with stress birefringence;
 placing the porous medium model in a porous medium model loading device, and imposing boundary constraints on the porous medium model by the porous medium model loading device, and performing high-pressure injection of stress birefringence fluid in pores, so as to form the dynamic hydromechanical coupling effect of fluid flow process;
 obtaining a photoelastic fringe image and a surface deformation image of the porous medium model under the hydromechanical coupling effect by a measuring device;
 wherein the photoelastic fringe image determines a stress field of a fluid and a porous skeleton under the hydromechanical coupling effect; wherein a surface deformation image determines a strain field of the porous skeleton and/or a fluid-solid interface under the hydromechanical coupling effect.

* * * * *